US005768795A

United States Patent [19]
Jimenez

[11] Patent Number: 5,768,795
[45] Date of Patent: Jun. 23, 1998

[54] STUD TEMPLATE

[76] Inventor: Leonard K. Jimenez, P.O. Box 902, Sumner, Wash. 98390

[21] Appl. No.: 604,140

[22] Filed: Feb. 20, 1996

[51] Int. Cl.[6] .................... G01D 21/00
[52] U.S. Cl. .................... 33/613; 33/613
[58] Field of Search .................... 33/613, 474, 476, 33/480, 481, 492, 429

[56] References Cited

U.S. PATENT DOCUMENTS

| | | | |
|---|---|---|---|
| 1,257,683 | 2/1918 | Defenbaugh | 33/480 |
| 3,169,320 | 2/1965 | Currie | 33/429 |
| 3,834,033 | 9/1974 | Pinkard | 33/429 |
| 4,361,964 | 12/1982 | Hennesee | 33/481 |
| 4,499,666 | 2/1985 | Smith | 33/476 |
| 4,527,337 | 7/1985 | Dreiling . | |
| 4,574,492 | 3/1986 | Miller | 33/481 |
| 4,607,438 | 8/1986 | DeFrange | 33/451 |
| 4,625,415 | 12/1986 | Diamontis . | |
| 4,651,434 | 3/1987 | Haynes . | |
| 4,654,978 | 4/1987 | Wolford, Jr. | 33/481 |
| 4,736,525 | 4/1988 | Deason | 33/481 |
| 4,742,619 | 5/1988 | Swanson | 33/474 |
| 5,083,380 | 1/1992 | Robertson . | |
| 5,396,710 | 3/1995 | Battaglia | 33/613 |
| 5,456,015 | 10/1995 | Butcher et al. | 33/481 |

*Primary Examiner*—Thomas B. Will
*Attorney, Agent, or Firm*—Michael I. Kroll

[57] ABSTRACT

A stud template (10) which comprises a generally rectangular elongate flat blade (12) sized to cover the width of a plurality of side by side sole plates (14) before installation. An elongate T-shaped member (16) is integrally formed along one long side of the flat blade (12). The T-shaped member (16) can engage a longitudinal edge of one of the outermost sole plates (14). A facility (18) is for repetitively marking a series of stud location stations along the length of the sole plates (14) simultaneously. When the sole plates (14) are installed in a wall frame of a building (20), studs (22) can be erected upon the stud location stations on the sole plates (14) quickly and without error.

16 Claims, 2 Drawing Sheets

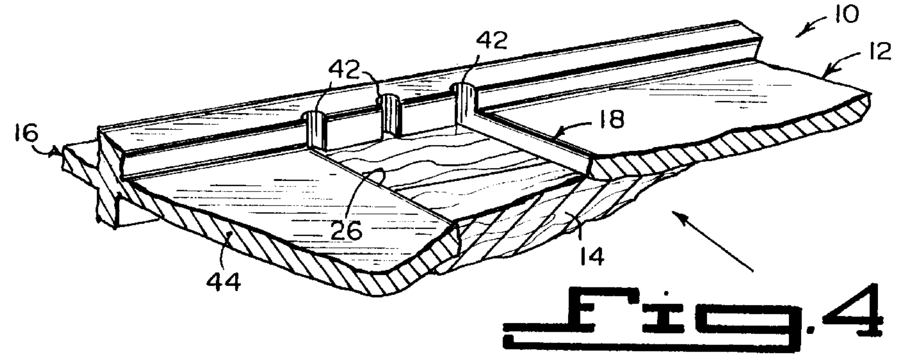
Fig. 4
Fig. 5
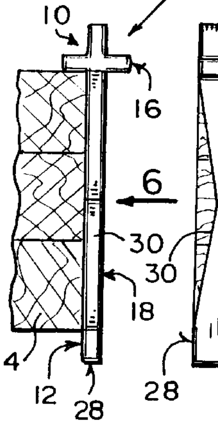
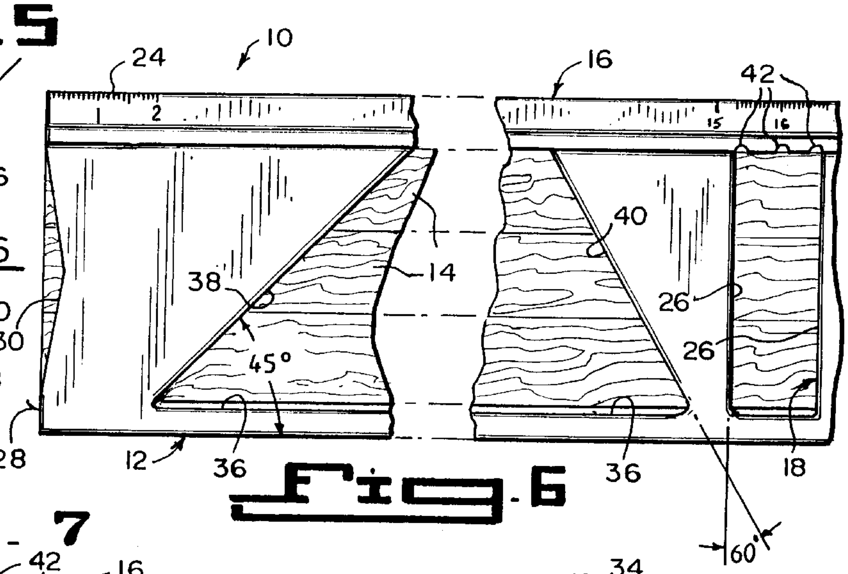
Fig. 6
Fig. 7
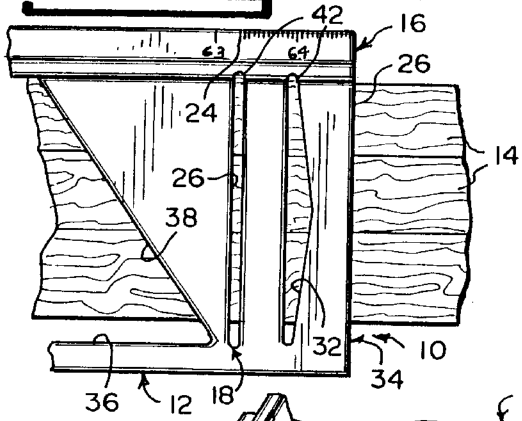
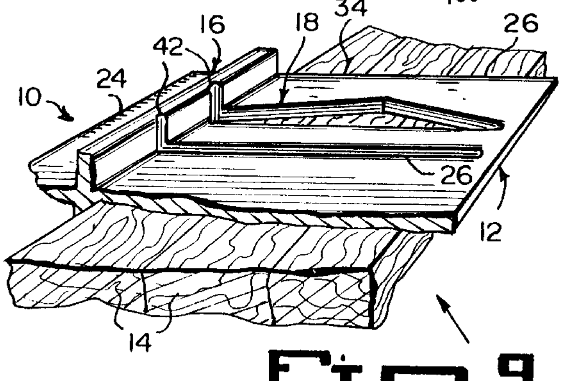
Fig. 9
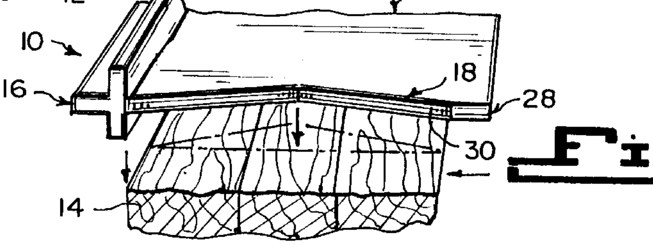
Fig. 8

STUD TEMPLATE

BACKGROUND OF THE INVENTION

1. Field of the Invention

The instant invention relates generally to position marking tools and more specifically it relates to a stud template.

2. Description of the Prior Art

Numerous position marking tools have been provided in prior art. For example, U.S. patents numbered U.S. Pat. No. 4,527,337 to Dreiling; U.S. Pat. No. 4,625,415 to Diamontis; U.S. Pat. No. 4,651,434 to Haynes and U.S. Pat. No. 5,083,380 to Robertson all are illustrative of such prior art. While these units may be suitable for the particular purpose to which they address, they would not be as suitable for the purposes of the present invention as heretofore described.

Dreiling, Cletus F.

Framing Stud Template

U.S. Pat. No. 4,527,337

In the layout of the location of studs for wall framing a template is provided to eliminate the tedious, time-consuming and oftentimes inaccurate procedure of using carpenter's squares, rules and the like with accompanying pencil marks. The template uses a number of blocks slidable along a blade provided with a rule scale, each releasably held in place by a thumb screw. Each block has a pair of parallel cutting edges for scribing the stringers thereacross by the simple expedient of tapping the blocks with a hammer, such that, during assembly of the framework, each stud need merely be held between a pair of marks inscribed into the stringer while nailing the stud in place.

Diamontis, Damon

Stud Spacer

U.S. Pat. No. 4,625,415

A stud spacer for construction work comprising a rigid support to which spacers are fixed at longitudinally spaced intervals corresponding to the distance between studs to hold the latter at the desired spacing while the studs are being secured.

Haynes, William P.

Carpenter's Template

U.S. Pat. No. 4,651,434

A carpenter's template useful particularly for residential framing construction has an L-shaped cross section formed by a face plate having a width of about four inches and a flange having a width of about one and five eights of an inch. The face plate has three series of slots for marking rafter cuts for common rafters, hip and valley rafters, and jack rafters, respectively. The flange is configured at its ends into angled edges useful for cheek cuts and dub cuts. The face plate is marked with indicia related to roof pitch to permit the carpenter to select the appropriate slots.

Robertson, Larry D.

Duct Notching Template Apparatus

U.S. Pat. No. 5,083,380

The disclosure relates to a duct notching template apparatus having slidably positionable and settable end templates and a center template. The end templates have hooked or tabbed edges for engaging the edge of a piece of sheet metal to be scribed for notching. The templates contain windows for viewing the measuring indicia on the longitudinal element on which they are disposed.

SUMMARY OF THE INVENTION

A primary object of the present invention is to provide a stud template that will overcome the shortcomings of the prior art devices.

Another object is to provide a stud template in which a person can mark off sixteen inch intervals wall stud positions from a scale on the template onto a plurality of side by side sole plates simultaneously, so that once the sole plates are installed in place wall studs can be erected upon the sole plates quickly.

An additional object is to provide a stud template that will reduce mistakes when the wall stud positions are marked onto the sole plates, since the scale on the template and the index edges will accurately locate the sixteen inch intervals upon the sole plates without error.

A further object is to provide a stud template that is simple and easy to use.

A still further object is to provide a stud template that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 4 is an enlarged vertical perspective view of the area indicated by arrow 4 in FIG. 2, showing it placed upon side by side sole plates before installation.

FIG. 5 is an enlarged left end view taken in the direction of arrow 5 in FIG. 2, showing the instant invention placed onto the side by side sole plate which are rotated ninety degrees.

FIG. 6 is a top view taken in the direction of arrow 6 in FIG. 5, with parts broken away.

FIG. 7 is a top view similar to FIG. 6, showing a right side portion of the instant invention on the side by side sole plates.

FIG. 8 is an enlarged horizontal perspective view of the left side portion of the instant invention slightly lifted off of the side by side sole plates, showing the index mark made thereupon.

FIG. 9 is an enlarged horizontal perspective view of the right side portion of the instant invention placed upon the side by side sole plates.

Similar reference characters denote corresponding features consistently throughout the attached drawings.

DETAILED DESCRIPTION OF THE PREFERRED EMBODIMENTS

Figure 1:
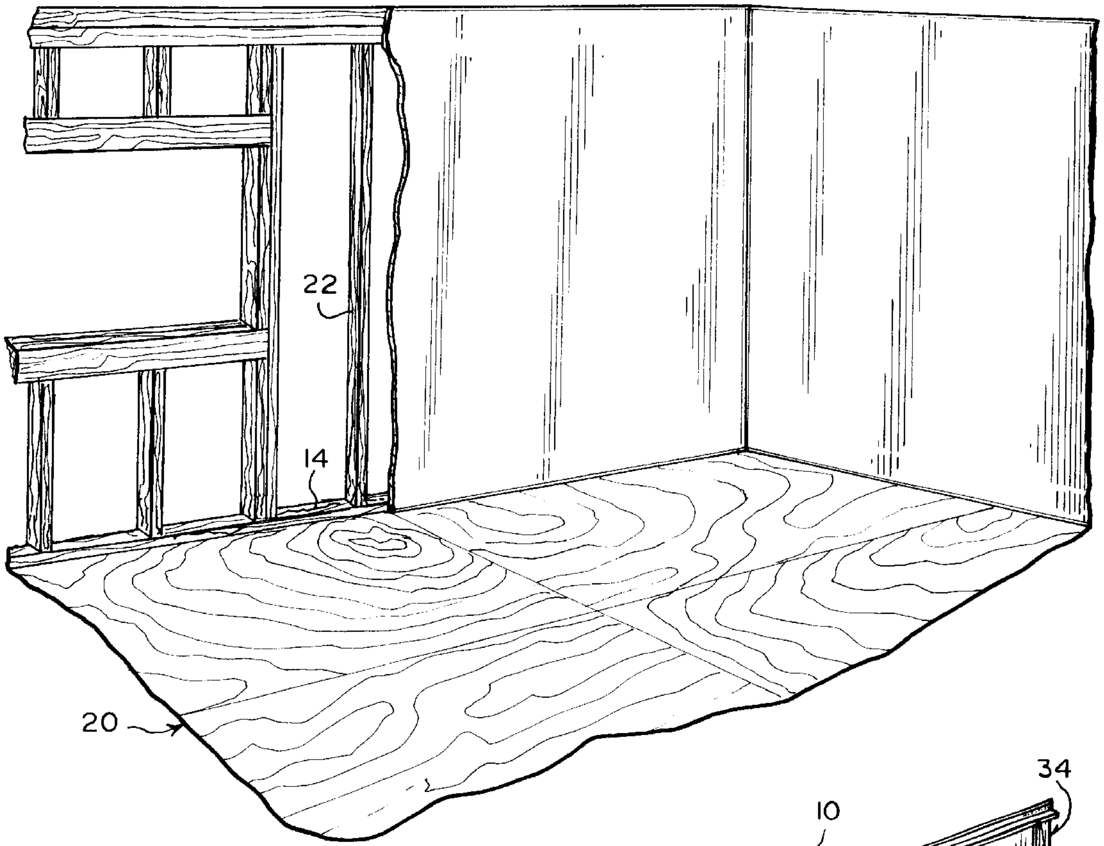
FIG. 1 is a perspective view of a portion of a building with part of a wall broken away, showing a plurality of studs erected upon a marked sole plate made by the instant invention.
Figure 2:
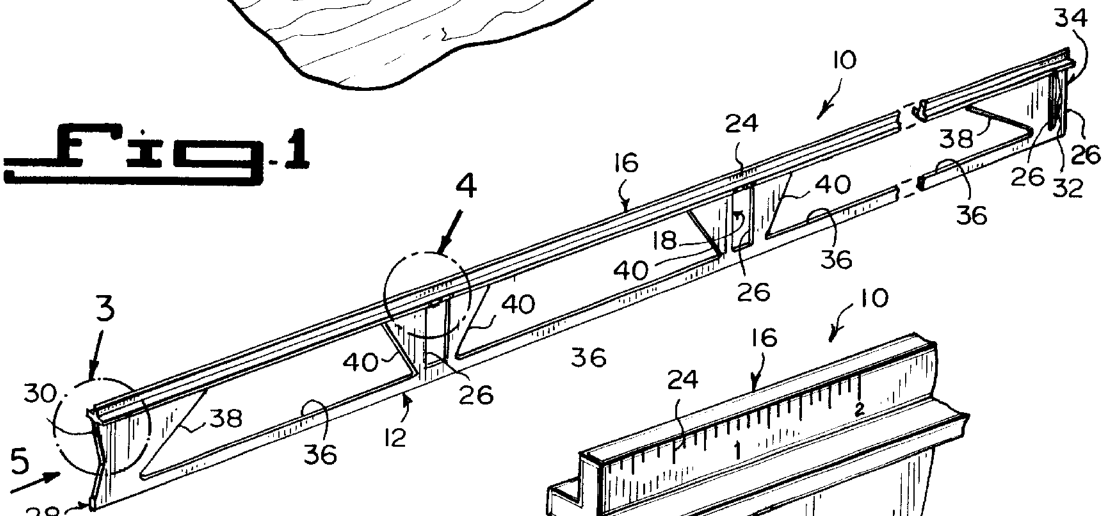
FIG. 2 is a vertical perspective view with parts broken away of the instant invention per se.
Figure 3:
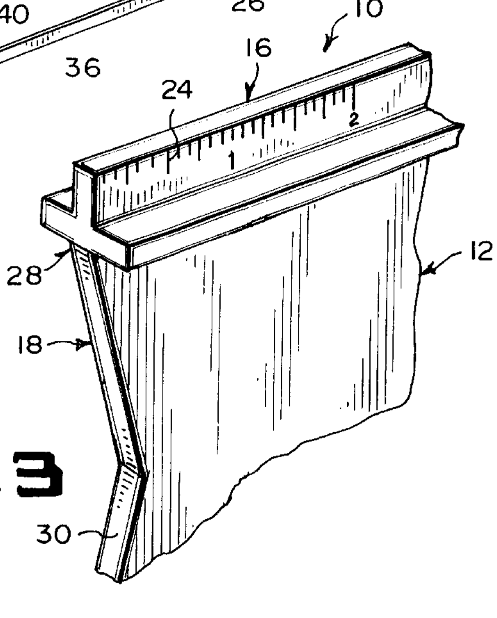
FIG. 3 is an enlarged vertical perspective view of the area indicated by arrow 3 in FIG. 2.

Turning now descriptively to the drawings, in which similar reference characters denote similar elements throughout the several views, FIGS. 2 through 9 illustrate a stud template 10 which comprises a generally rectangular elongate flat blade 12 sized to cover the width of a plurality of side by side sole plates 14 before installation. An elongate T-shaped member 16 is integrally formed along one long side of the flat blade 12. The T-shaped member 16 can engage a longitudinal edge of one of the outermost sole plates 14.

A facility 18 is for repetitively marking a series of stud location stations along the length of the sole plates 14 simultaneously. When the sole plates 14 are installed in a wall frame of a building 20, studs 22 can be erected upon the stud location stations on the sole plates 14 quickly and without error, as shown in FIG. 1. Graduated measuring indicia 24 is disposed along a length of said T-shaped member 16 parallel with the flat blade 18, so that the lengths of the sole plates 14 can be measured therefrom.

The marking facility 18 includes the flat blade 12 having a plurality of a pair of spaced apart parallel scoring edges 26 extending across the widths of the sole plates 14 at equal intervals therealong away from a first short end 28 of the flat blade 12. Each pair of parallel scoring edges 26 are equal to the width of each stud 22 at each of the stud location stations. The equal intervals are sixteen inches apart on center, while the pair of parallel scoring edges 26 are one and a half inches apart, which is the width of each stud 22.

Marking facility 18 further contains a first generally V-shaped index scoring edge 30 at the first short end 28 of the flat blade 12. A second generally V-shaped index scoring edge 32 adjacent a second short end 34 of the flat blade 12 is centrally located between the last pair of parallel scoring edges 26. The first generally V-shaped index scoring edge 30 can be moved to the mark made at the second generally V-shaped index scoring edge 32, to extend the equal intervals of the pairs of parallel scoring edges 26 along the lengths of the side by side sole plates 14 to be marked with additional stud locations.

The flat blade 12 has a plurality of opening 36 between the pairs of parallel scoring edges 26, so as to reduce the amount of material needed for the flat blade 12, making the flat blade 12 lighter in weight.

The first opening 36 at the first short end 28 has a forty five degree scoring edge 38 adjacent the first short end 38 and an opposite sixty degree scoring edge 40, which extends across the widths of the sole plates 14. The last opening 36 at the second short end 34 has a forty five degree scoring edge 38 adjacent the second short end 34 and an opposite sixty degree scoring edge 40 which extends across the widths of the sole plates 14.

Each opening 36 between the first opening 36 and the last opening 36, has two sixty degree scoring edges 40 that are opposite from each other, which extends across the widths of the sole plates 14.

The T-shaped member 16 has a plurality of recesses 42 located on a bottom edge of a length perpendicular with the flat blade 12 at the top of each parallel scoring edge 26, centrally therebetween and at the second generally V-shaped index scoring edge 32 to compensate for a scribe tool used with the stud template 10. The flat blade 12 and the T-shaped member 16 are fabricated out of a strong durable material 44 selected from the group consisting of metal, plastic and wood.

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters patent is set forth in the appended claims:

1. A stud template which comprises:

a) a generally rectangular elongate flat blade sized to cover the width of a plurality of side by side sole plates before installation;

b) an elongate T-shaped member integrally formed along one long side of said flat blade, whereby said T-shaped member can engage a longitudinal edge of one of the outermost sole plates; and c) means for repetitively marking a series of stud location stations along the length of the sole plates simultaneously, so that when the sole plates are installed in a wall frame of a building, studs can be erected upon the stud location stations on the sole plates quickly and without error, said marking means including said flat blade having a plurality of pairs of spaced apart parallel scoring edges extending across the widths of the sole plates at equal intervals therealong away from a first short end of said flat blade, wherein each said pair of parallel scoring edges being equal to the width of each stud at each of the stud location stations, and said marking means further including:

i) a first generally V-shaped index scoring edge at a first short end of said flat blade; and ii) a second generally V-shaped index scoring edge adjacent a second short end of said flat blade centrally located between said last pair of parallel scoring edges, so that said first generally V-shaped index scoring edge can be moved to the mark made at said second generally V-shaped index scoring edge to extend said equal intervals of said pairs of parallel scoring edges along the lengths of the side by side sole plates to be marked with additional stud locations.

2. A stud template as recited in claim 1, further including graduated measuring indicia disposed along a length of said T-shaped member parallel with said flat blade, so that the lengths of the sole plates can be measured therefrom.

3. A stud template as recited in claim 1, wherein said equal intervals are sixteen inches apart on center.

4. A stud template as recited in claim 1, wherein each said pair of parallel scoring edges are one and a half inches apart, which is the width of each stud.

5. A stud template as recited in claim 1, further including said flat blade having a plurality of openings between said pairs of parallel scoring edges, so as to reduce the amount of material needed for said flat blade making said flat blade lighter in weight.

6. A stud template as recited in claim 5, further including:

a) said first opening at said first short end having a forty five degree scoring edge adjacent said first short end and an opposite sixty degree scoring edge which extends across the widths of the sole plates; and b) said last opening at said second short end having a forty five degree scoring edge adjacent said second short end and an opposite sixty degree scoring edge which extends across the widths of the sole plates.

7. A stud template as recited in claim 6, further including each said opening between said first opening and said last opening, having two sixty degree scoring edges that are opposite from each other which extends across the widths of the sole plates.

8. A stud template as recited in claim 1, further including said T-shaped member having a plurality of recesses located on a bottom edge of a length perpendicular with said flat blade at the top of each parallel scoring edge, centrally therebetween and at said second generally V-shaped index scoring edge to compensate for a scribe tool used with said stud template.

9. A stud template as recited in claim 1, wherein said flat blade and said T-shaped member are fabricated out of a strong durable material selected from the group consisting of metal, plastic and wood.

10. A stud template as recited in claim 2, wherein said equal intervals are sixteen inches apart on center.

11. A stud template as recited in claim 10, wherein each said pair of parallel scoring edges are one and a half inches apart, which is the width of each stud.

12. A stud template as recited in claim 11, further including said flat blade having a plurality of openings between said pairs of parallel scoring edges, so as to reduce the amount of material needed for said flat blade making said flat blade lighter in weight.

13. A stud template as recited in claim 12, further including:

a) said first opening at said first short end having a forty five degree scoring edge adjacent said first short end and an opposite sixty degree scoring edge which extends across the widths of the sole plates; and b) said last opening at said second short end having a forty five degree scoring edge adjacent said second short end and an opposite sixty degree scoring edge which extends across the widths of the sole plates.

14. A stud template as recited in claim 13, further including each said opening between said first opening and said last opening, having two sixty degree scoring edges that are opposite from each other which extends across the widths of the sole plates.

15. A stud template as recited in claim 14, further including said T-shaped member having a plurality of recesses located on a bottom edge of a length perpendicular with said flat blade at the top of each parallel scoring edge, centrally therebetween and at said second generally V-shaped index scoring edge to compensate for a scribe tool used with said stud template.

16. A stud template as recited in claim 15, wherein said flat blade and said T-shaped member are fabricated out of a strong durable material selected from the group consisting of metal, plastic and wood.

* * * * *